(12) United States Patent
Kozuka et al.

(10) Patent No.: US 12,114,729 B2
(45) Date of Patent: Oct. 15, 2024

(54) UPPER, SHOE, AND METHOD OF PRODUCING UPPER

(71) Applicant: ASICS CORPORATION, Kobe (JP)

(72) Inventors: Yuya Kozuka, Kobe (JP); Shinsaku Wakasugi, Kobe (JP); Misao Nakagawa, Kobe (JP); Norihiko Taniguchi, Kobe (JP); Genki Hatano, Kobe (JP); Shingo Takashima, Kobe (JP); Satoru Abe, Kobe (JP); Kenta Takahama, Kobe (JP)

(73) Assignee: ASICS CORPORATION, Kobe (JP)

( * ) Notice: Subject to any disclaimer, the term of this patent is extended or adjusted under 35 U.S.C. 154(b) by 59 days.

(21) Appl. No.: 17/701,287

(22) Filed: Mar. 22, 2022

(65) Prior Publication Data
US 2022/0312895 A1 Oct. 6, 2022

(30) Foreign Application Priority Data
Mar. 30, 2021 (JP) .................................. 2021-057721

(51) Int. Cl.
*A43B 23/02* (2006.01)
*A43B 23/04* (2006.01)

(52) U.S. Cl.
CPC ...... *A43B 23/0245* (2013.01); *A43B 23/0205* (2013.01); *A43B 23/0265* (2013.01); *A43B 23/042* (2013.01)

(58) Field of Classification Search
CPC ............ A43B 23/0205; A43B 23/0245; A43B 23/0265; A43B 23/042
(Continued)

(56) References Cited

U.S. PATENT DOCUMENTS

| 1,526,555 A | * | 2/1925 | Luppino | .................. A43B 9/02 |
| | | | | 12/146 CK |
| 1,532,327 A | * | 4/1925 | Luppino | ................ D05B 93/00 |
| | | | | 36/49 |

(Continued)

FOREIGN PATENT DOCUMENTS

| JP | H06-072402 U | 10/1994 |
| JP | 2019-130370 A | 8/2019 |

(Continued)

OTHER PUBLICATIONS

The extended European search report issued by the European Patent Office on Jul. 21, 2022, which corresponds to European Patent Application No. 22163809.1-1015 and is related to U.S. Appl. No. 17/701,287.

(Continued)

*Primary Examiner* — Sharon M Prange
(74) *Attorney, Agent, or Firm* — Studebaker & Brackett PC

(57) ABSTRACT

An upper is used for a shoe. The upper includes a main body portion located on an upper side of the shoe and a bottom surface portion connected to the main body portion at at least a part of an outer periphery of the main body portion. The main body portion is seamless and in a shape having an inner periphery on an inner side of the outer periphery. The shoe includes the upper that includes the main body portion that is seamless and is in the shape having the inner periphery on the inner side of the outer periphery and a sole provided on a bottom surface portion side of the upper.

8 Claims, 13 Drawing Sheets

(58) Field of Classification Search
USPC .................................................. 36/47, 48, 49
See application file for complete search history.

(56) References Cited

U.S. PATENT DOCUMENTS

| | | | | |
|---|---|---|---|---|
| 2,360,506 | A * | 10/1944 | Miner ...................... | A43B 9/12 |
| | | | | 12/146 D |
| 2,440,393 | A * | 4/1948 | Clark ...................... | D04B 1/123 |
| | | | | 450/156 |
| 3,081,563 | A | 3/1963 | Dronoff | |
| 3,082,450 | A | 3/1963 | Tumino | |
| 11,957,214 | B2 * | 4/2024 | Bessho ................... | B32B 5/026 |
| 2010/0140825 | A1 * | 6/2010 | Park ........................ | B29C 49/00 |
| | | | | 264/46.4 |
| 2013/0239438 | A1 | 9/2013 | Dua et al. | |
| 2018/0368524 | A1 * | 12/2018 | Taniguchi .......... | A43B 23/0275 |
| 2021/0037913 | A1 * | 2/2021 | Bessho ................... | A43B 1/04 |
| 2021/0052033 | A1 * | 2/2021 | Bessho ............. | A43B 23/0295 |
| 2022/0240628 | A1 * | 8/2022 | Kozuka ................... | A43D 8/12 |
| 2023/0270212 | A1 * | 8/2023 | Oshima ................... | A43D 3/02 |
| | | | | 382/154 |
| 2023/0354951 | A1 * | 11/2023 | Issa ........................ | A41D 31/24 |

FOREIGN PATENT DOCUMENTS

| | | |
|---|---|---|
| JP | 2021-023582 A | 2/2021 |
| KR | 10-2015-0073926 A | 7/2015 |
| WO | 2017/115806 A1 | 7/2017 |

OTHER PUBLICATIONS

Communication pursuant to Article 94(3) EPC issued by the European Patent Office on Dec. 14, 2023, which corresponds to European Patent Application No. 22163809.1-1015 and is related to U.S. Appl. No. 17/701,287.

Office Action; "Notice of Reasons for Refusal," mailed by the Japanese Patent Office on Aug. 27, 2024, which corresponds to Japanese Application No. 2021-057721; with English language translation.

* cited by examiner

UPPER, SHOE, AND METHOD OF PRODUCING UPPER

This nonprovisional application is based on Japanese Patent Application No. 2021-057721 filed with the Japan Patent Office on Mar. 30, 2021, the entire contents of which are hereby incorporated by reference.

BACKGROUND OF THE INVENTION

Field of the Invention

The present disclosure relates to an upper, a shoe, and a method of producing an upper.

Description of the Background Art

In producing a shoe, an upper in a three-dimensional shape is produced by forming a plurality of two-dimensional parts in conformity with a three-dimensional shape of a shoe last (last) and combining the plurality of parts by sewing or with an adhesive. For example, in Japanese Patent Laying-Open No. 2019-130370, an upper in a three-dimensional shape is produced by joining by sewing, an outer heel portion and an inner heel portion of a part separate at the heel portions.

SUMMARY OF THE INVENTION

An upper side of a shoe is in a complicated three-dimensional shape. Therefore, when a part of a main body portion of an upper corresponding to the upper side of the shoe is two-dimensionally developed, the part is separate at the heel portion as disclosed in Japanese Patent Laying-Open No. 2019-130370. Consequently, in producing the upper, the separate heel portions should be joined to each other by sewing or the like.

A joint portion where joint by sewing or the like is carried out, however, produces a local contact pressure in a foot portion, which leads to poor wearing comfort of a user. When the joint portion is formed in the heel portion, a vertically extending linear heel portion is formed in the main body portion, which lowers feeling of fit of the user.

An object of the present disclosure is to provide an upper in a three-dimensional shape in conformity with a shape of a shoe last, a shoe, and a method of producing an upper.

An upper according to one aspect of the present disclosure is an upper to be used for a shoe, and the upper includes a main body portion located on an upper side of the shoe and a bottom surface portion connected to the main body portion at at least a part of an outer periphery of the main body portion. The main body portion is seamless and is in a shape having an inner periphery on an inner side of the outer periphery.

A shoe according to one aspect of the present disclosure includes the upper described previously and a sole provided on a bottom surface portion side of the upper.

A method of producing an upper according to one aspect of the present disclosure is a production method of producing an upper to be used for a shoe, and the method includes two-dimensionally developing a three-dimensional shape data of a shoe last and creating a cutting pattern of a main body portion of the upper which is seamless and is in a shape having an inner periphery on an inner side of an outer periphery, cutting a sheet into the main body portion based on the cutting pattern, and covering the shoe last with the cut-out main body portion and expanding and/or shrinking the main body portion in conformity with a shape of the shoe last. The creating a cutting pattern includes generating a two-dimensional pattern of the main body portion, the two-dimensional pattern being such a two-dimensional pattern that a portion corresponding to a topline of the shoe last is set as an inner periphery of the main body portion and a portion corresponding to a surface of the shoe last is virtually cut into a plurality of radially arranged strips, adjusting a length of each gap provided between adjacent strips in the two-dimensional pattern such that an expanded and/or shrunk shape conforms to a shape of the shoe last, and setting the outer periphery of the two-dimensional pattern including each adjusted gap as the outer periphery of the cutting pattern.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
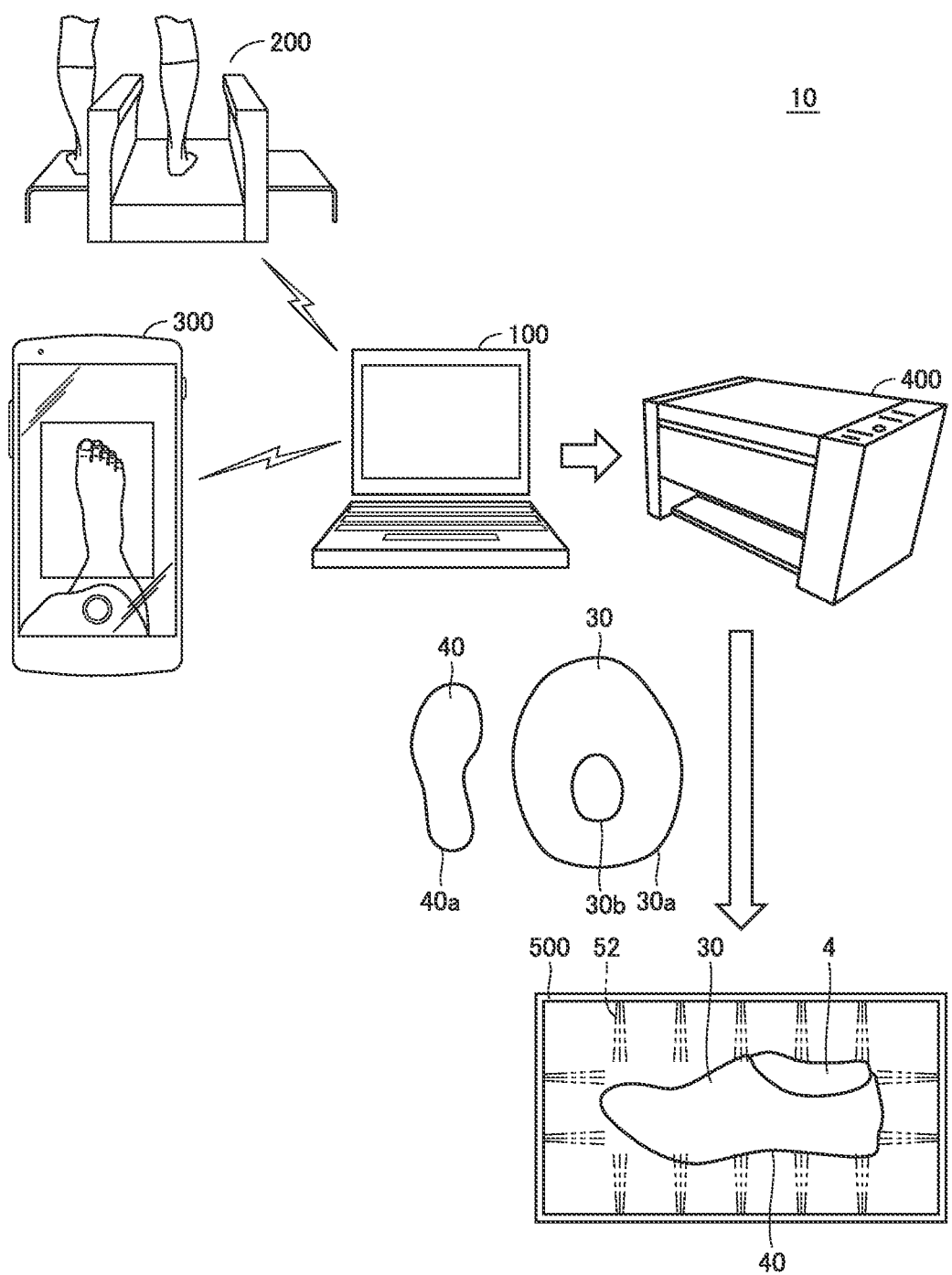
FIG. 1 is a schematic view showing a configuration example of an upper producing system according to an embodiment.

An embodiment will be described below with reference to the drawings. In the description below, the same elements have the same reference characters allotted and their labels and functions are also the same. Therefore, detailed description thereof will not be repeated.

Embodiment

In an embodiment, an example of application of the present invention will be described. First, in the embodiment, when manufacturing a custom-made shoe tailored to a foot of a user at, for example, a store, shoe last data is generated based on foot shape data obtained by measuring a foot shape using a measuring apparatus. Furthermore, in the embodiment, a cutting pattern of a sheet for producing an upper of the shoe based on the generated shoe last data is calculated, and the sheet is cut using a cutting apparatus based on the cutting pattern. Thereafter, in the embodiment, the shoe last is covered with the cut-out upper, and the upper is expanded and/or shrunk in conformity with the shape of the shoe last. In the embodiment, an upper producing system that produces an upper by performing a series of processing as such will be described.

FIG. 1 is a schematic view showing a configuration example of an upper producing system 10 according to the embodiment. Referring to FIG. 1, the upper producing system 10 includes a design support apparatus 100, a measuring apparatus 200 that measures a foot shape, a cutting apparatus 400 that cuts a sheet based on a cutting pattern, and a heating apparatus 500 that expands and/or shrinks the upper. Although the upper producing system 10 shown in FIG. 1 includes the measuring apparatus 200, the upper producing system 10 may use prestored shoe last data without including the measuring apparatus 200. In addition, depending on stores, or at a remote location such as a user's house, the foot shape may be measured using a mobile terminal 300 such as a smartphone, instead of the measuring apparatus 200. Furthermore, the design support apparatus 100 can communicate with a not-shown data server placed inside or outside a store.

Figure 2:
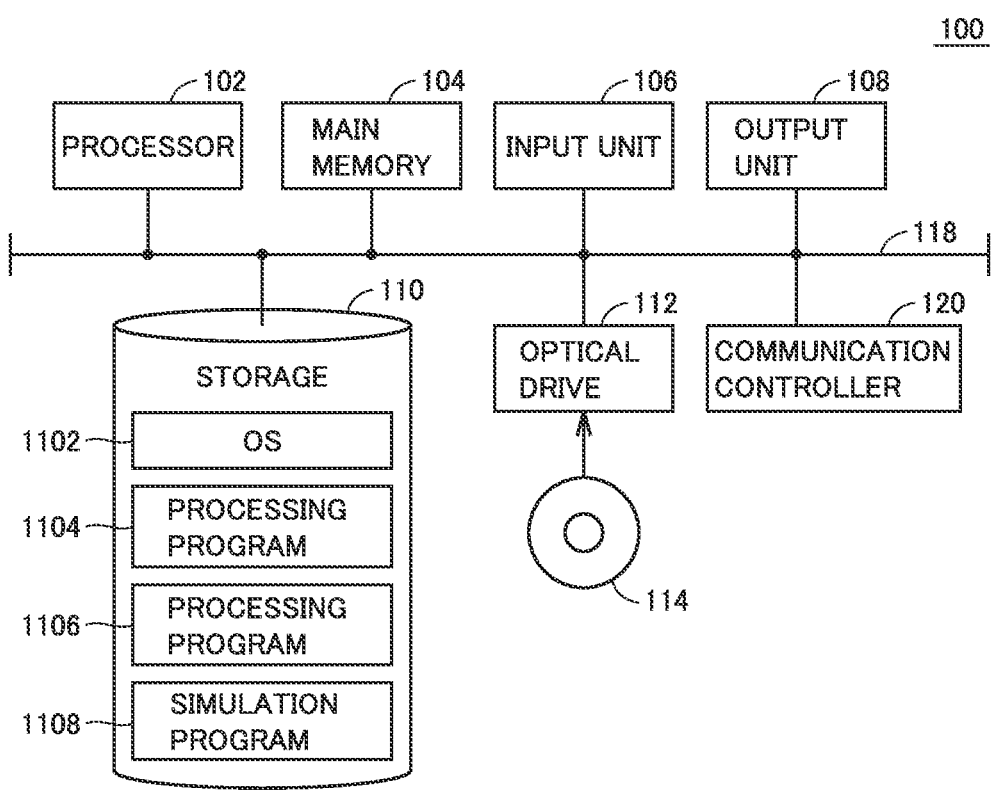
FIG. 2 is a schematic view showing a hardware configuration example of a design support apparatus according to the embodiment.

The design support apparatus 100 generates shoe last data based on foot shape data obtained from the measuring apparatus 200 or the mobile terminal 300, and further, calculates a cutting pattern of a sheet based on the shoe last data. FIG. 2 is a schematic view showing a hardware configuration example of the design support apparatus 100 according to the embodiment. Referring to FIG. 2, the design support apparatus 100 includes a processor 102, a main memory 104, an input unit 106, an output unit 108, a storage 110, an optical drive 112, and a communication controller 120. These components are connected through a processor bus 118.

The processor 102 is implemented by a CPU, a GPU or the like, and can read programs (by way of example, an OS 1102 and a processing program 1104) stored in the storage 110 and deploy the programs in the main memory 104 for execution. The processor 102 executes various programs read from the storage 110. Specifically, the processing program 1104 computes the shoe last data from the foot shape data and additional information received by the input unit 106, based on a prescribed algorithm. Using a prescribed algorithm, a processing program 1106 calculates the cutting pattern of the sheet based on the shoe last data. A simulation program 1108 is used in the processing program 1106, and simulates a direction in which the sheet is expanded and/or shrunk to adjust a length of an outer periphery of a two-dimensional pattern. The processor 102 that executes the programs corresponds to a computing unit of the design support apparatus 100.

The main memory 104 is implemented by, for example, a volatile storage device such as a DRAM or an SRAM. The storage 110 is implemented by, for example, a non-volatile storage device such as an HDD or an SSD.

In addition to the OS 1102 for implementing a basic function, the processing programs 1104 and 1106 and the simulation program 1108 for providing a function as the design support apparatus 100 are stored in the storage 110.

The input unit 106 includes an input interface connected to the measuring apparatus 200 or the mobile terminal 300 to receive the foot shape data from the measuring apparatus 200 or the mobile terminal 300. The input unit 106 is implemented by a keyboard, a mouse, a microphone, a touch device or the like, and can further receive the information selected by the user.

The output unit 108 includes an output interface that outputs the cutting pattern of the sheet calculated by the processor 102 to the cutting apparatus 400. The output unit 108 is implemented by a display, various indicators, a printer or the like, and outputs a processing result or the like from the processor 102.

The communication controller 120 exchanges data with another control device or the like by using wired or wireless communication. The design support apparatus 100 may exchange the foot shape data and the additional information with the measuring apparatus 200 or the mobile terminal 300 through the communication controller 120, and may exchange the cutting pattern with the cutting apparatus 400 through the communication controller 120. In addition to the communication controller 120, a USB controller connected to the processor bus 118 may be provided to exchange the data with another control device or the like through USB connection.

The design support apparatus 100 includes the optical drive 112 that may read a computer-readable program stored in a recording medium 114 (e.g., optical recording medium such as a digital versatile disc (DVD)) in a non-transitory manner, and install the program in the storage 110 or the like.

Although the processing program 1104 and the like executed in the design support apparatus 100 may be installed through computer-readable recording medium 114, the processing program 1104 and the like may be installed by being downloaded from a server device or the like on a network. In addition, the functions provided by the design support apparatus 100 according to the embodiment may be implemented by using a part of a module provided by the OS.

Although FIG. 2 shows the configuration example in which the processor 102 executes the programs to thereby provide the functions required as the design support apparatus 100, a part or all of these provided functions may be implemented by using a dedicated hardware circuit (such as, for example, an ASIC or an FPGA). The configuration of the design support apparatus 100 shown in FIG. 2 is illustrative and the present disclosure is not limited to this configuration.

The measuring apparatus 200 is implemented by a three-dimensional foot shape scanner using laser measurement. A laser measurement apparatus that is built into walls provided on both sides of a foot put on a top board measures the foot while moving from a toe to a heel of the foot, thereby obtaining three-dimensional foot shape data of the user. A measurement method or the like of the measuring apparatus 200 is not particularly limited, as long as it can measure the three-dimensional foot shape data. The mobile terminal 300 such as a smartphone may also be used to capture an image of the foot of the user and obtain image data of the foot, and the foot shape data may be generated from the obtained image data of the foot through preliminarily installed software.

The cutting apparatus 400 is, for example, an apparatus that cuts a two-dimensional sheet such as fabric along a cutting pattern with laser beams. The cutting apparatus 400 cuts the two-dimensional sheet into a main body portion 30 and a bottom surface portion 40 of the upper. The main body portion 30 is a part of the upper located on the upper side of the shoe, seamless, and in a shape having an inner periphery 30b on an inner side of an outer periphery 30a. The bottom surface portion 40 is a part of the upper connected to the main body portion 30 at at least a part of the outer periphery 30a of the main body portion 30. A method of cutting is not limited to laser beams, and the two-dimensional sheet such as fabric may be cut with a blade.

The heating apparatus 500 is an apparatus that heats the upper 3 obtained by sewing to each other, the main body portion 30 and the bottom surface portion 40 that were cut out by the cutting apparatus 400, with a shoe last 4 being covered with the upper 3. The upper 3 is not in conformity with the shape of the shoe last 4 simply by sewing the main body portion 30 and the bottom surface portion 40 to each other, and the upper 3 in conformity with the shape of the shoe last 4 can be produced by heating in the heating apparatus 500. In particular, when the upper 3 is made from a heat-shrinkable sheet, the heating apparatus 500 can shrink the upper 3 in conformity with the shape of the shoe last 4 by heating the upper with the shoe last 4 being covered with the upper. Alternatively, when the upper 3 is made from a shape-memory sheet, a shape of the upper 3 expanded and/or shrunk in conformity with the shape of the shoe last 4 can be maintained by heating the upper 3 with the shoe last 4 being covered with the upper 3.

Specifically, the heating apparatus 500 heats the upper 3 with high-temperature steam 52 emitted from an inner surface, with the upper 3 made from a heat-shrinkable sheet being accommodated therein. Through this steam heating, the entire upper 3 yet to be formed can uniformly be heated. Therefore, the upper 3 can uniformly be deformed in conformity with the shoe last 4 and the upper 3 can be formed in conformity with the shape of the shoe last 4. Hot air heating, hot water heating, or microwaves may be used in heating apparatus 500, other than steam heating. The upper 3 yet to be formed may be heated partially rather than being heated in its entirety.

Figure 3A:
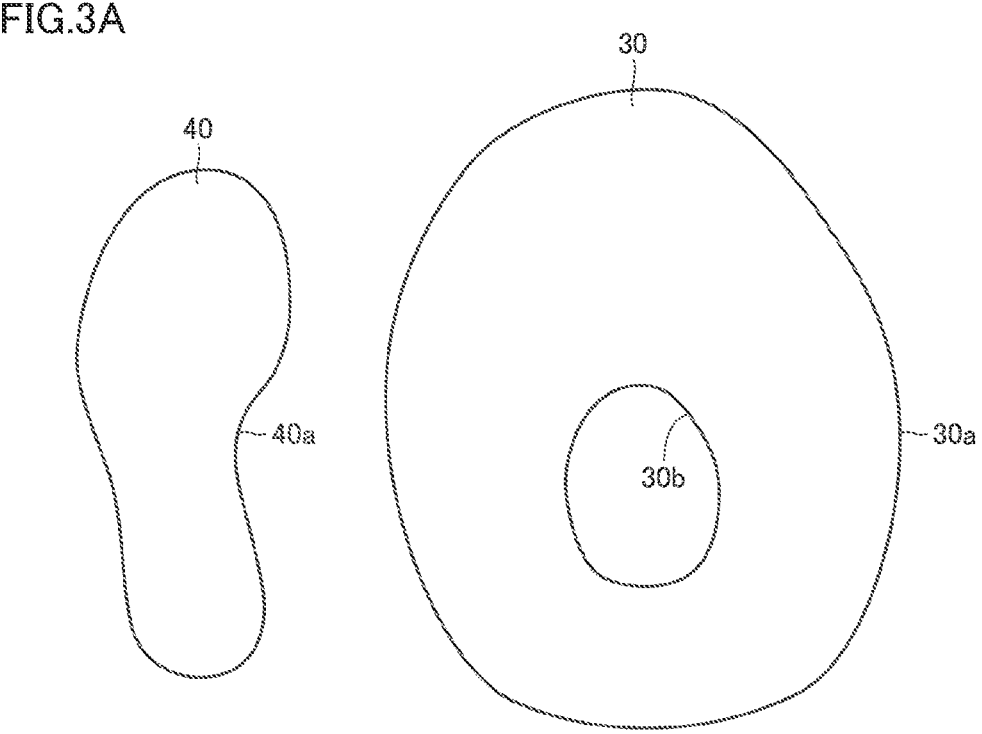
FIGS. 3A and 3B are schematic views of an upper according to the embodiment.
Figure 3B:
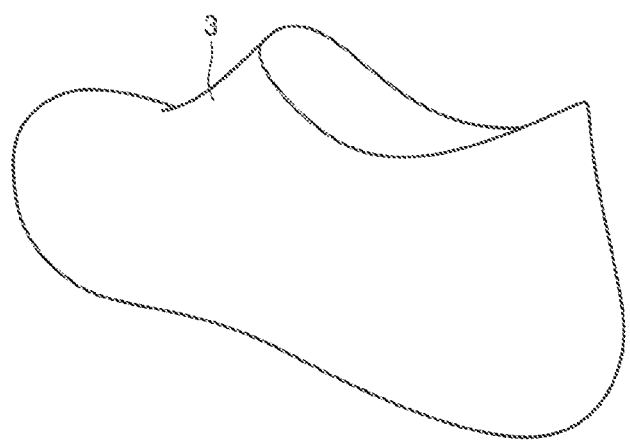
Figure 4A:
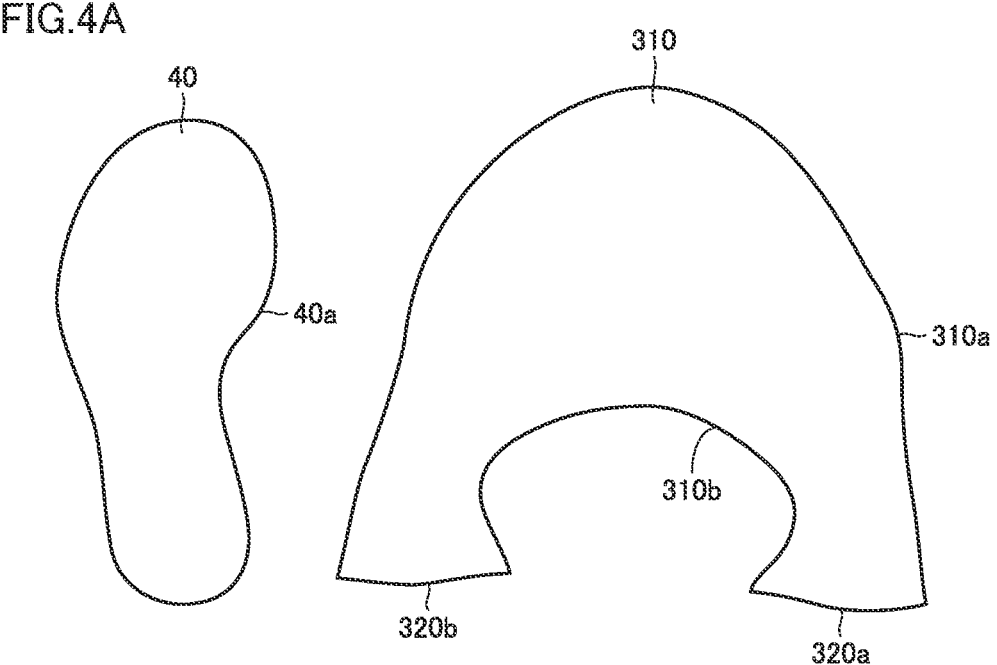
FIGS. 4A and 4B are schematic views of an upper to be compared.
Figure 4B:
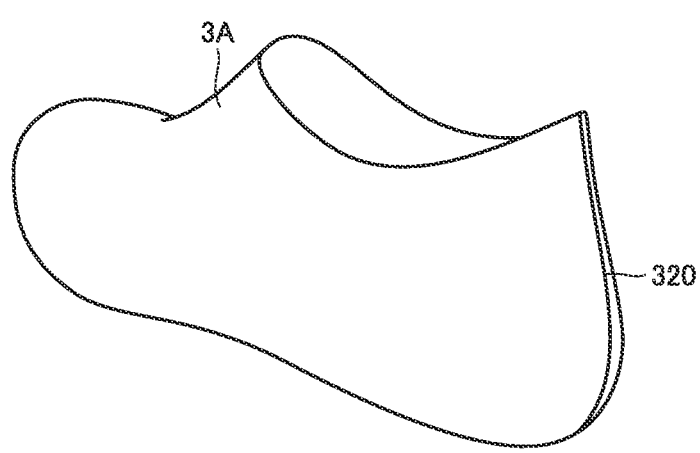

A shape of the main body portion 30 and the bottom surface portion 40 of the upper 3 will now be described. FIGS. 3A and 3B are schematic views of the upper 3 according to the embodiment. FIGS. 4A and 4B are schematic views of an upper 3A to be compared. FIG. 3A and FIG. 4A are plan views of the main body portion and the bottom surface portion. FIG. 3B and FIG. 4B are perspective views of the upper after the main body portion and the bottom surface portion are sewn to each other and the upper is formed in conformity with the shoe last.

In the upper 3 according to the embodiment, as shown in FIG. 3A, the main body portion 30 is seamless and is in a shape having the inner periphery 30b on the inner side of the outer periphery 30a. In other words, the main body portion 30 is in an annular hollow shape (in a doughnut shape). Furthermore, when the upper 3 in which the outer periphery 30a of the main body portion 30 and the outer periphery 40a of the bottom surface portion 40 are connected to each other by sewing to each other is expanded and/or shrunk, a length of the outer periphery 30a of the main body portion 30 is adjusted to be in conformity with the shape of the shoe last 4. By thus adjusting the length of the outer periphery 30a of the main body portion 30, the upper 3 as shown in FIG. 3B can be produced. Since the upper 3 does not include a joint portion where joint by sewing or the like is carried out in the heel portion, a local contact pressure is not produced in the foot portion and wearing comfort of a user does not become poor.

In the upper 3A to be compared, as shown in FIG. 4A, a main body portion 310 is in a U shape. In other words, the main body portion 310 is not seamless but an outer periphery 310a and an inner periphery 310b are separate from each other at an edge 320a and an edge 320b. By joining the separate edges 320a and 320b to each other and connecting the outer periphery 310a of the main body portion 310 and the outer periphery 40a of the bottom surface portion 40 to each other by sewing, the upper 3A as shown in FIG. 4B is made. Since the upper 3A includes a joint portion 320 where joining by sewing or the like is carried out in the heel portion, a local contact pressure is produced in the foot portion and wearing comfort of the user becomes poor.

The upper side of the shoe is in a complicated three-dimensional shape. Therefore, when the main body portion of the upper corresponding to the upper side of the shoe is developed to two-dimensional parts, in order to adjust the length of the outer periphery of the main body portion and the length of the outer periphery of the bottom surface portion, a part of the main body portion as in FIG. 4A should be separated. Then, in the embodiment, by adjusting the outer periphery 30a of the main body portion 30 in consideration of expansion and/or shrinkage after forming the main body portion 30, the seamless annular and hollow main body portion 30 as in FIG. 3A is realized. A method of producing the upper including adjustment of the outer periphery 30a of the main body portion 30a in consideration of expansion and/or shrinkage after forming will be described below.

Figure 5:
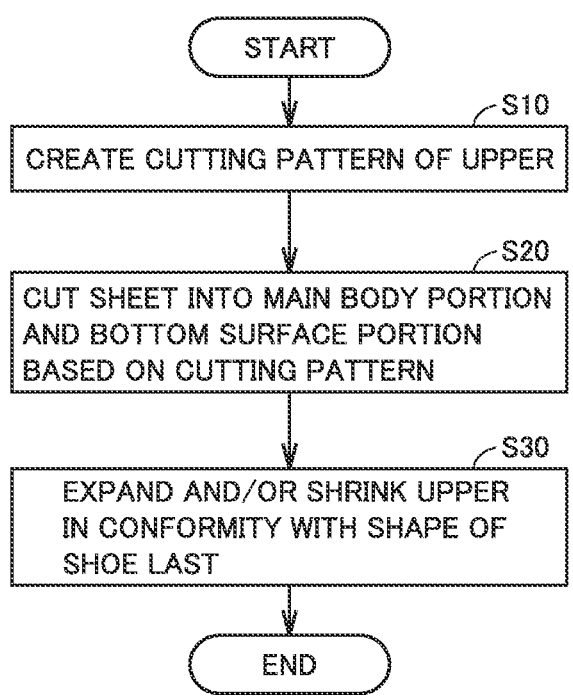
FIG. 5 is a flowchart for illustrating a method of producing an upper according to the embodiment.

FIG. 5 is a flowchart for illustrating a method of producing the upper 3 according to the embodiment. Initially, the upper producing system 10 two-dimensionally develops with the design support apparatus 100, three-dimensional shape data of the shoe last 4 and creates a cutting pattern of the upper 3 (step S10). Then, the upper producing system 10 cuts with the cutting apparatus 400, a sheet into the main body portion 30 and the bottom surface portion 40 of the upper 3 based on the cutting pattern created by the design support apparatus 100 (step S20). Furthermore, the upper producing system 10 covers, in the heating apparatus 500, the shoe last 4 with the upper 3 obtained by combining the main body portion 30 and the bottom surface portion 40 cut out by the cutting apparatus 400, and expands and/or shrinks the upper 3 in conformity with the shape of the shoe last 4 (step S30). When the upper 3 is formed only of the main body portion 30, the upper 3 may be expanded and/or shrunk with the shoe last 4 being covered only with the main body portion 30.

Figure 6:
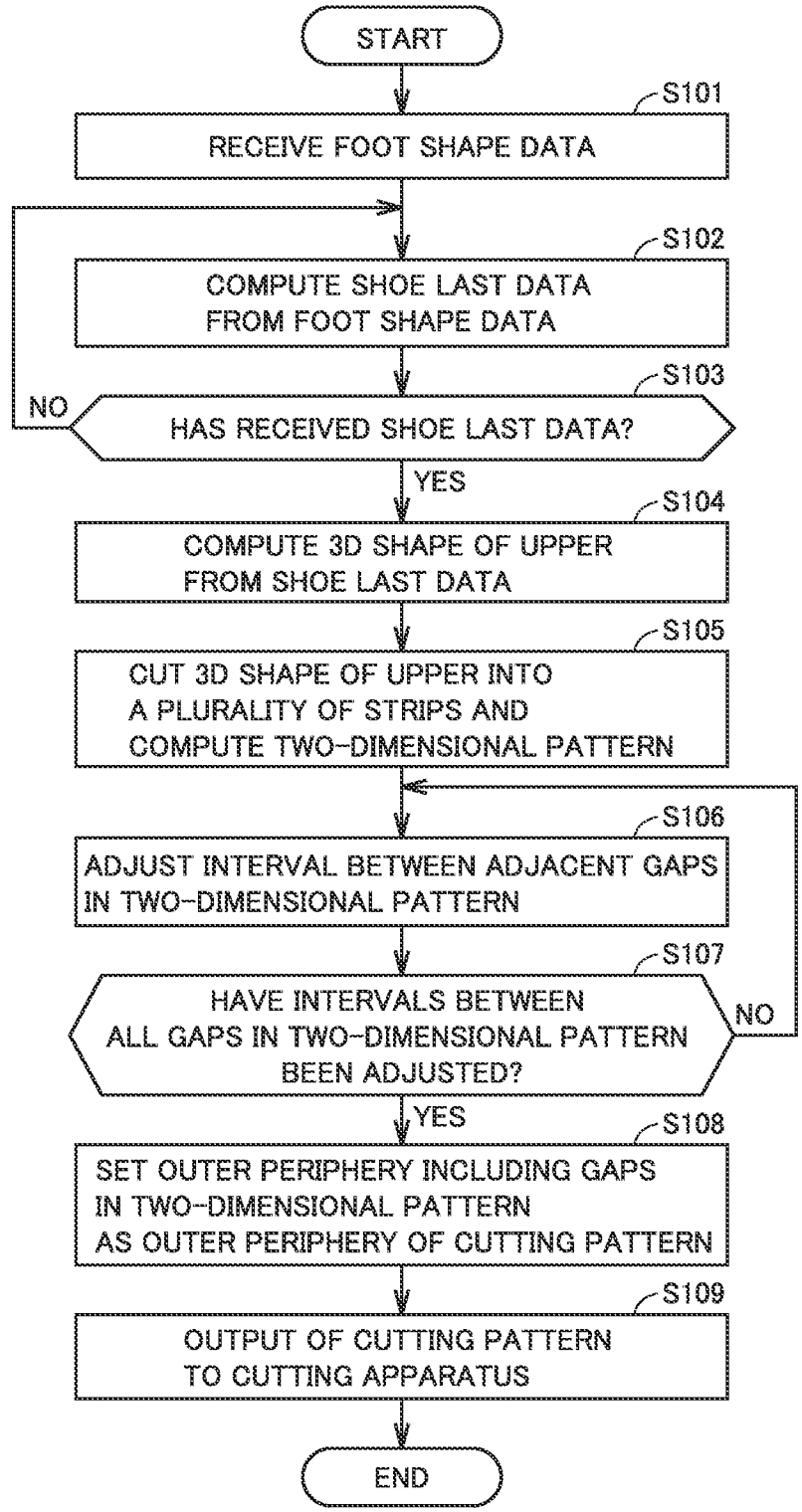
FIG. 6 is a flowchart for illustrating a method of creating a cutting pattern of the upper according to the embodiment.

Processing for creating the cutting pattern of the upper 3 in the design support apparatus 100 will be described further in detail. FIG. 6 is a flowchart for illustrating a method of creating a cutting pattern of the upper 3 according to the embodiment. First, the design support apparatus 100 receives foot shape data measured using the measuring apparatus 200 or the mobile terminal 300 (step S101). The design support apparatus 100 computes shoe last data from the foot shape data (step S102).

The design support apparatus 100 determines whether or not the design support apparatus 100 has received the shoe last data (step S103). In the case of a custom-made shoe, the design support apparatus 100 receives the shoe last data computed from the measured foot shape data. However, the design support apparatus 100 may receive existing shoe last data. When the design support apparatus 100 has not received the shoe last data (NO in step S103), the design support apparatus 100 returns the process to step S102 because computation of the shoe last data has not ended or the existing shoe last data has not been received.

When the design support apparatus 100 has received the shoe last data (YES in step S103), the design support apparatus 100 computes three-dimensional (3D) shape data of the upper 3 from the shoe last data (step S104). Specifically, the design support apparatus 100 computes the three-dimensional shape data of the upper 3 by specifying a plurality of pieces of data of the upper 3 prepared based on information about a model of the shoe to be manufactured and adjusting a size of the specified upper so as to conform to an outer surface of the shoe last. The design support apparatus 100 may generate a shape of a topline of the upper 3 based on user's selective information (such as, for example, no poor shoe fit, or the shoe is hard to come off), and apply the shape of the topline of the upper to the three-dimensional shape data of the upper 3.

The design support apparatus 100 two-dimensionally develops the three-dimensional shape data of the upper 3 and computes a two-dimensional pattern of the upper 3 (step S105). Since the bottom surface portion 40 of the upper 3 is in a simple shape, the length of the outer periphery 40a does not have to be adjusted even when the bottom surface portion is two-dimensionally developed. Since the main body portion 30 of the upper 3 is in a complicated three-dimensional shape, the length of the outer periphery 30a should be adjusted in order to develop the main body portion to a seamless annular and hollow two-dimensional pattern.

Initially, the design support apparatus 100 generates such a two-dimensional pattern of the main body portion 30 that a portion corresponding to the surface of the shoe last 4 is virtually cut into a plurality of radially arranged strips in order to develop the main body portion 30 in the three-dimensional shape simply to an annular hollow shape without taking into consideration the length of the outer periphery 30a.

Figure 7A:
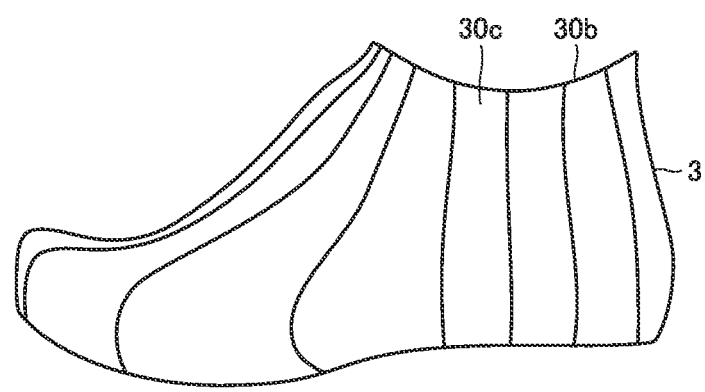
FIGS. 7A and 7B are schematic views for illustrating processing for developing the upper in a three-dimensional shape to a two-dimensional pattern of a main body portion.
Figure 7B:
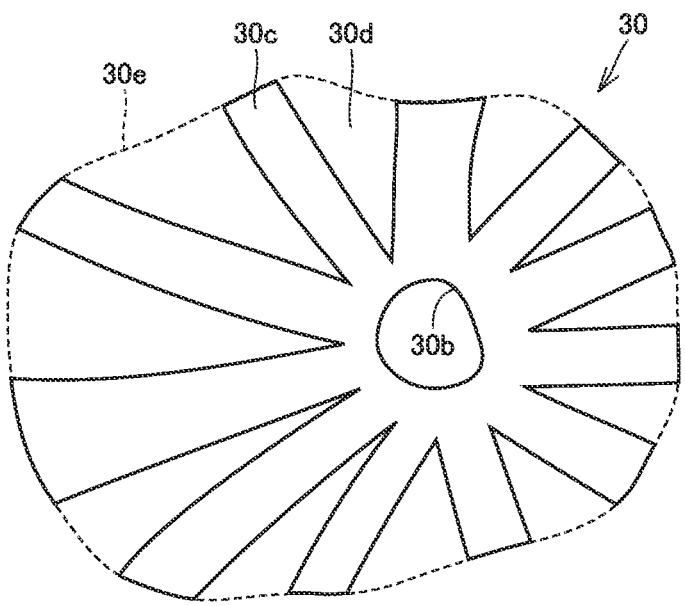

Specifically, FIGS. 7A and 7B are schematic views for illustrating processing for developing the upper 3 in a three-dimensional shape to a two-dimensional pattern of the main body portion 30. FIG. 7A shows the three-dimensional shape of the upper 3 and shows division lines in the surface of the upper 3 for virtual cutting into a plurality of strips 30c, the division lines extending from the inner periphery 30b corresponding to the topline of the shoe last 4. FIG. 7B shows such a two-dimensional pattern of the main body portion 30 that the three-dimensional shape of the upper 3 is virtually cut into a plurality of strips 30c in two dimensions. The two-dimensional pattern of the main body portion 30 is in such a shape that a plurality of strips 30c are radially arranged from the inner periphery 30b. When the portion corresponding to the surface of the shoe last 4 is cut into the plurality of strips 30c, a gap 30d is provided between adjacent strips 30c. Therefore, an outer perimeter 30e defined by connection of a plurality of strips 30c and a plurality of gaps 30d in the two-dimensional pattern of the main body portion 30 shown in FIG. 7B is significantly longer than the outer periphery 40a of the bottom surface portion 40, and it cannot be adopted as it is as the outer periphery 30a of the main body portion 30.

Then, the design support apparatus 100 adjusts the length of each gap 30d provided between adjacent strips 30c of the main body portion 30 such that the shape of the expanded and/or shrunk main body portion 30 conforms to the shape of the shoe last 4 (step S106). In production of the upper 3, the upper 3 is expanded and/or shrunk in conformity with the shape of the shoe last 4 as described with reference to step S30. For example, a knit material, a mesh material, artificial leather, nonwoven fabric, a heat-shrinkable material, or the like is used as a material of the upper 3. A direction of expansion and/or shrinkage and a ratio of expansion and/or shrinkage are different for each material. For the heat-shrinkable material, a direction of expansion and/or shrinkage is also referred to as a direction of heat shrinkage and the ratio of expansion and/or shrinkage is also referred to as a heat shrinkage.

In particular, in producing the upper 3 from the heat-shrinkable material, the heat shrinkage (the ratio of expansion and/or shrinkage) is greatly varied depending on a direction. Therefore, simply by adjusting each gap 30d such that the outer perimeter 30e defined by connection of the plurality of strips 30c and the plurality of gaps 30d matches with the outer periphery 40a of the bottom surface portion 40, a portion not in conformity with the shape of the shoe last is made.

Figure 8:
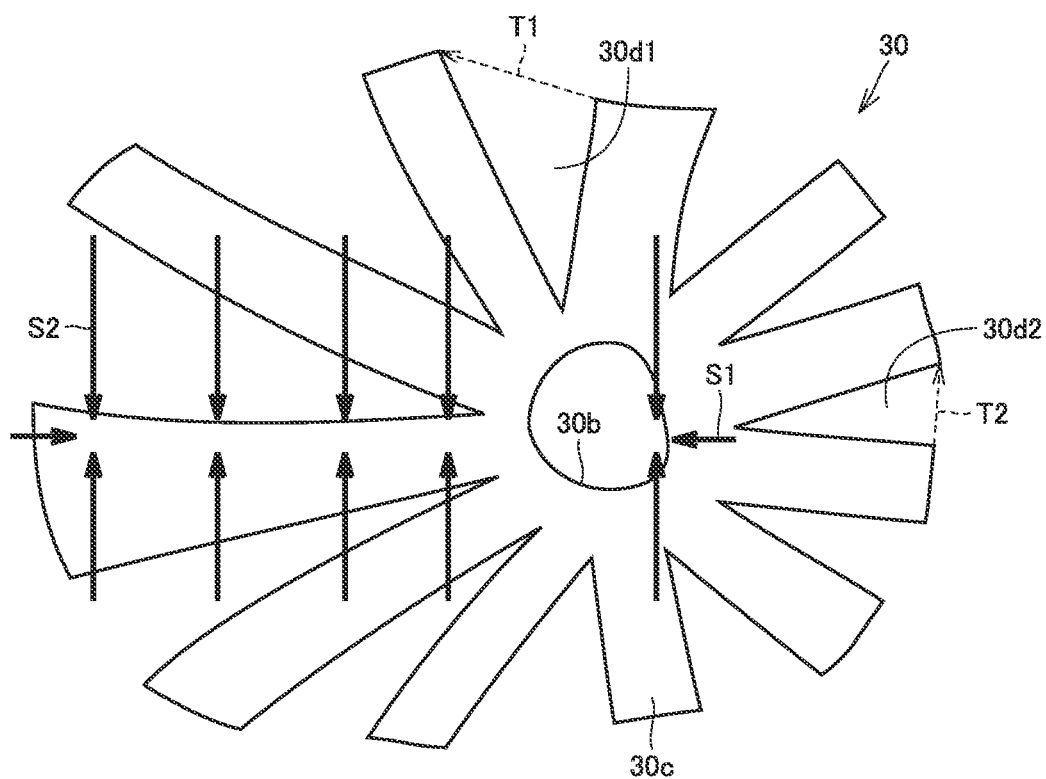
FIG. 8 is a schematic view showing exemplary adjustment of a length of each gap in consideration of a direction of expansion and/or shrinkage and a ratio of expansion and/or shrinkage of a sheet.

Then, the design support apparatus 100 adjusts the length of each gap 30d in consideration of the direction of expansion and/or shrinkage and the ratio of expansion and/or shrinkage of the sheet with the simulation program 1108. FIG. 8 is a schematic view showing exemplary adjustment of a length of each gap 30d in consideration of the direction of expansion and/or shrinkage and the ratio of expansion and/or shrinkage of the sheet. As shown in FIG. 8, the sheet from which the main body portion 30 is cut out has a first direction S1 in which the sheet has a first heat shrinkage and a second direction S2 in which the sheet has a second heat shrinkage higher than the first heat shrinkage, and a longitudinal direction (a lateral direction in the figure) of the main body portion 30 is orthogonal to the second direction S2. Though the first direction S1 and the second direction S2 are orthogonal to each other in FIG. 8, they do not necessarily have to be orthogonal to each other. The first heat shrinkage in the first direction S1 may be 0 (zero).

The design support apparatus 100 adjusts the length of each gap 30d, for example, based on relation between the direction (the first direction S1 and the second direction S2) of expansion and/or shrinkage of the main body portion 30 and a tangential direction of the outer periphery of each gap 30d, for adjusting the length of each gap 30d in consideration of the direction of expansion and/or shrinkage and the ratio of expansion and/or shrinkage of the sheet. The simulation program 1108 adjusts the length of each gap 30d, for example, by assuming an elastic body that connects adjacent strips 30c to each other and finding force produced in each elastic body when heated, based on the direction of expansion and/or shrinkage and the ratio of expansion and/or shrinkage of the sheet. Information on the direction of expansion and/or shrinkage and the ratio of expansion and/or shrinkage of the sheet from which the main body portion 30 and the bottom surface portion 40 are cut out is stored in advance in the storage 110 of the design support apparatus 100 or a data server that can communicate with the design support apparatus 100.

For the main body portion 30 shown in FIG. 8, the simulation program 1108 adjusts the gap 30d in the direction the same as the first direction S1 to be narrower than the gap 30d in the direction the same as the second direction S2. Specifically, for a gap 30d1 shown in FIG. 8, the second direction S2 is substantially orthogonal to a tangential direction T1 of the outer periphery of the gap 30d1. Therefore, for the gap 30d1, an elastic body where force is mainly not produced in the tangential direction T1 is assumed, and the length of the gap 30d1 is adjusted based on force produced in the elastic body when heated. In other words, the simulation program 1108 adjusts the length of the gap 30d1 to be shorter so as to be consistent with the length of the outer periphery 40a of the bottom surface portion 40, because the length of the gap 30*d*1 in the tangential direction T1 is not much varied after expansion and/or shrinkage.

For a gap 30*d*2 shown in FIG. 8, the second direction S2 is substantially in parallel to a tangential direction T2 of the outer periphery of the gap 30*d*2. Therefore, for the gap 30*d*2, an elastic body where force is mainly produced in the tangential direction T2 is assumed, and the length of the outer periphery of the gap 30*d*2 is adjusted based on force produced in the elastic body when heated. In other words, the simulation program 1108 adjusts the length of the gap 30*d*2 to be longer in consideration of expansion and/or shrinkage of the sheet, because the length of the gap 30*d*2 in the tangential direction T2 is greatly varied after expansion and/or shrinkage.

Figure 9:
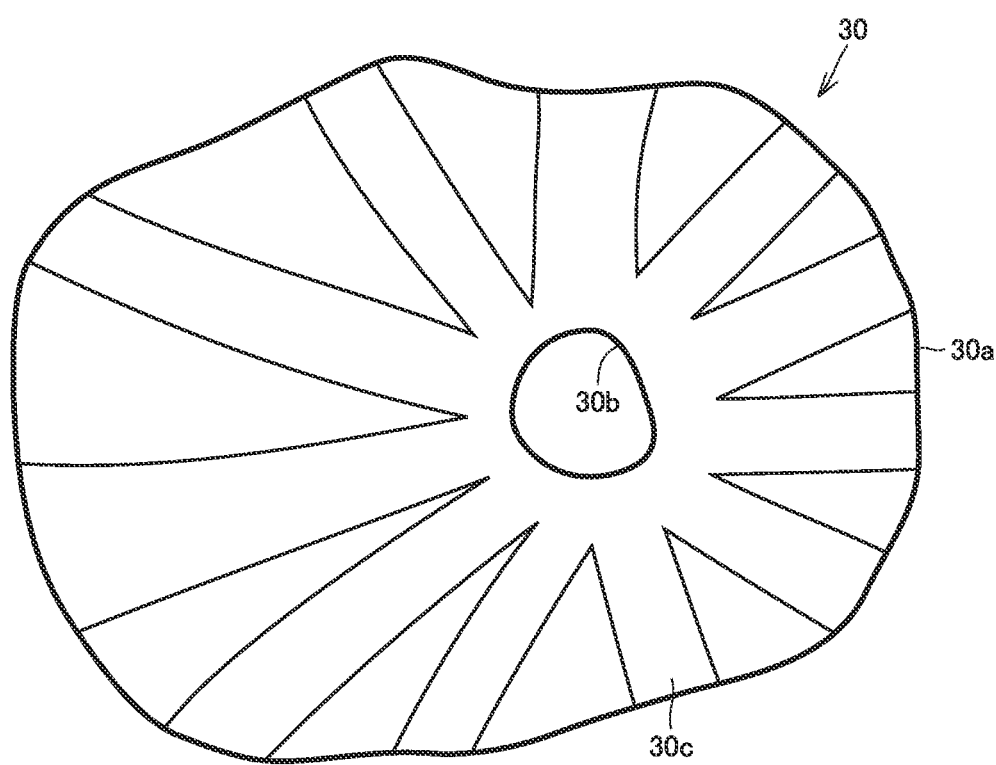
FIG. 9 is a plan view showing an exemplary sheet cutting pattern.

Referring back to FIG. 6, the design support apparatus 100 determines whether or not the lengths of all gaps 30*d* in the two-dimensional pattern of the main body portion 30 have been adjusted (step S107). When the lengths of all gaps 30*d* in the two-dimensional pattern have not been adjusted (NO in step S107), the design support apparatus 100 sequentially performs processing in step S106 for gaps 30*d* the lengths of which have not been adjusted. When the lengths of all gaps 30*d* in the two-dimensional pattern have been adjusted (YES in step S107), the design support apparatus 100 sets the outer periphery of the two-dimensional pattern including each adjusted gap 30*d* as the outer periphery 30*a* of the cutting pattern (step S108). FIG. 9 is a plan view showing an exemplary sheet cutting pattern. As shown in FIG. 9, in the cutting pattern of the main body portion 30, outer peripheries of the strips 30*c*, inclusive of the gaps 30*d* adjusted in step S106, are adopted as the outer periphery 30*a* of the main body portion 30. The design support apparatus 100 can thus set the cutting pattern of the main body portion 30 in consideration of expansion and/or shrinkage after forming.

The design support apparatus 100 provides to the cutting apparatus 400, the cutting pattern of the main body portion 30 for which the outer periphery 30*a* having the length of each gap 30*d* adjusted in consideration of expansion and/or shrinkage after forming is adopted (step S109). When the cutting apparatus 400 receives the sheet cutting pattern from the design support apparatus 100, the cutting apparatus cuts a heat-shrinkable sheet in accordance with the cutting pattern. The cutting pattern may be such a cutting pattern that the cutting pattern of the main body portion 30 and the cutting pattern of the bottom surface portion 40 are separate from each other or such a cutting pattern that the main body portion 30 and the bottom surface portion 40 connected to the main body portion 30 at at least a part of the outer periphery of the main body portion 30 are integrated. The cutting apparatus 400 can form the main body portion and the bottom surface portion by cutting from the same sheet, with the main body portion 30 and the bottom surface portion 40 being integrated, based on such a cutting pattern that the main body portion 30 and the bottom surface portion 40 are integrated.

When the cutting pattern of the main body portion 30 and the cutting pattern of the bottom surface portion 40 are separate from each other, the bottom surface portion 40 may be cut out from a material the same as a material for the sheet from which the main body portion 30 is cut out or a material different from the same.

Figure 10A:
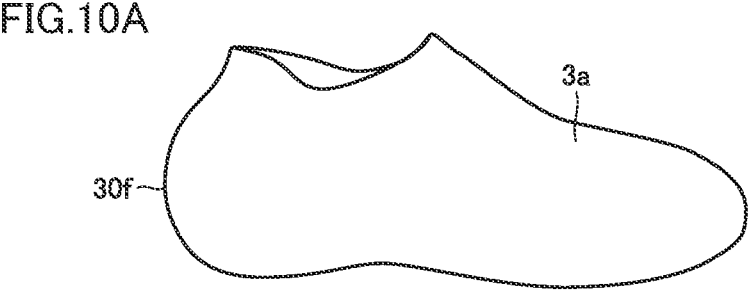
FIGS. 10A-10C are schematic views showing a shape of a heel portion of the upper.
Figure 10B:
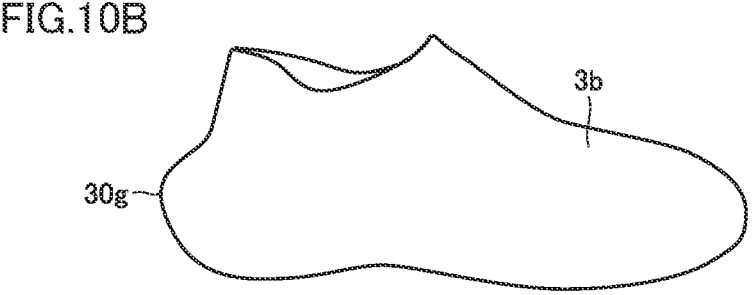
Figure 10C:
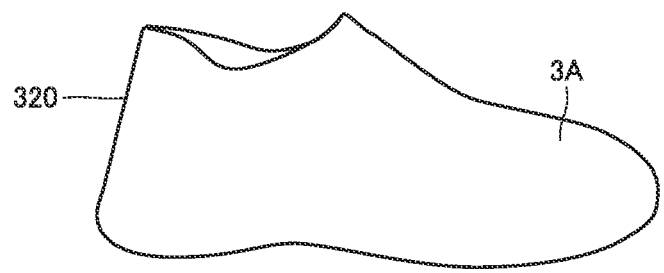

The upper 3 is described as including the seamless annular and hollow main body portion 30 as shown in FIG. 3A. By adopting this shape for the main body portion 30, heel portions in various shapes can be formed. FIGS. 10A-10C are schematic views showing a shape of a heel portion of the upper. FIG. 10A shows a side surface of an upper 3*a* for which a complicated shape as projecting outward and including an inflection point in a part of a curve is adopted for a heel portion 30*f*. FIG. 10B shows a side surface of an upper 3*b* for which a complicated shape as being recessed inward and including an inflection point in a part of a curve is adopted for a heel portion 30*g*. FIG. 10C shows the upper 3A to be compared, that has the joint portion 320 formed in the heel portion. Therefore, the heel portion shown in FIG. 10C is in a vertically extending linear shape. In the upper 3 shown in FIGS. 10A and 10B, a degree of freedom in a shape of the heel portion increases, a shape in conformity with the heel of a user can be adopted in addition to the vertically extending linear heel portion, and feeling of fit of the user is improved.

Figure 11A:
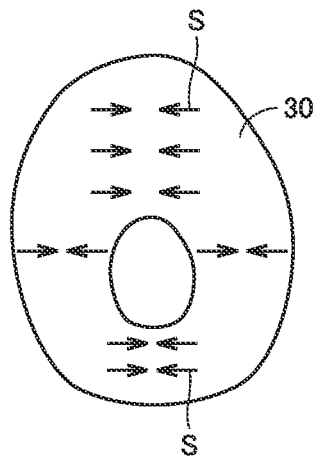
FIGS. 11A-11D are schematic views for illustrating a direction of expansion and/or shrinkage of the upper.
Figure 11B:
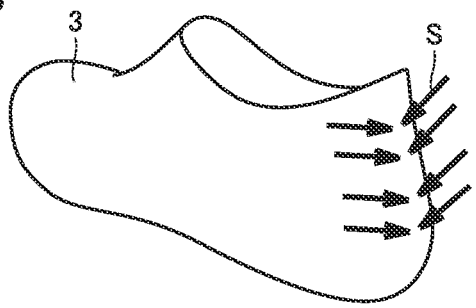

By adopting the seamless annular hollow shape for the upper 3, the direction of expansion and/or shrinkage of the sheet can agree to a direction in which the heel of the user is held. FIGS. 11A-11D are schematic views for illustrating a direction of expansion and/or shrinkage of the upper 3. FIG. 11A shows the main body portion 30 for which the seamless annular hollow shape is adopted and a direction S of expansion and/or shrinkage of the sheet is substantially orthogonal to the longitudinal direction (an upward/downward direction in the figure) of the main body portion 30. Therefore, when the upper 3 in such a three-dimensional shape is formed by using the main body portion 30, the direction S of expansion and/or shrinkage of the sheet extends in a horizontal direction in the heel portion of the upper 3. Therefore, the heel of the user can be held by expansion and/or shrinkage of the upper 3 and feeling of fit of the user is improved.

Figure 11C:
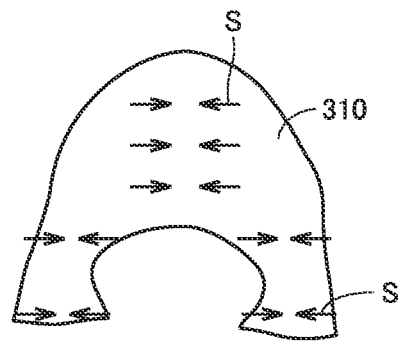
Figure 11D:
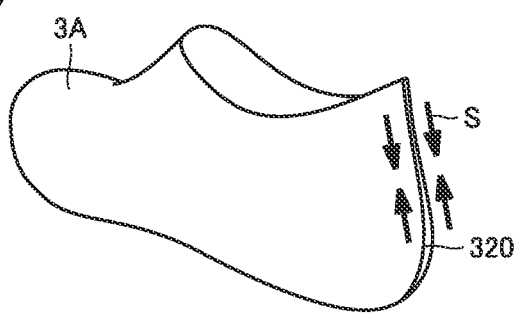

FIG. 11C shows the main body portion 310 to be compared, for which the U shape is adopted, and the direction S of expansion and/or shrinkage of the sheet is substantially orthogonal to the longitudinal direction (the upward/downward direction in the figure) of the main body portion 310. Therefore, when the upper 3A in the three-dimensional shape is formed by using the main body portion 310, the direction S of the expansion and/or shrinkage of the sheet extends in a vertical direction in the heel portion of the upper 3A. Therefore, even when the upper 3A expands and/or shrinks, the heel of the user is not held.

Shoe

Figure 12:
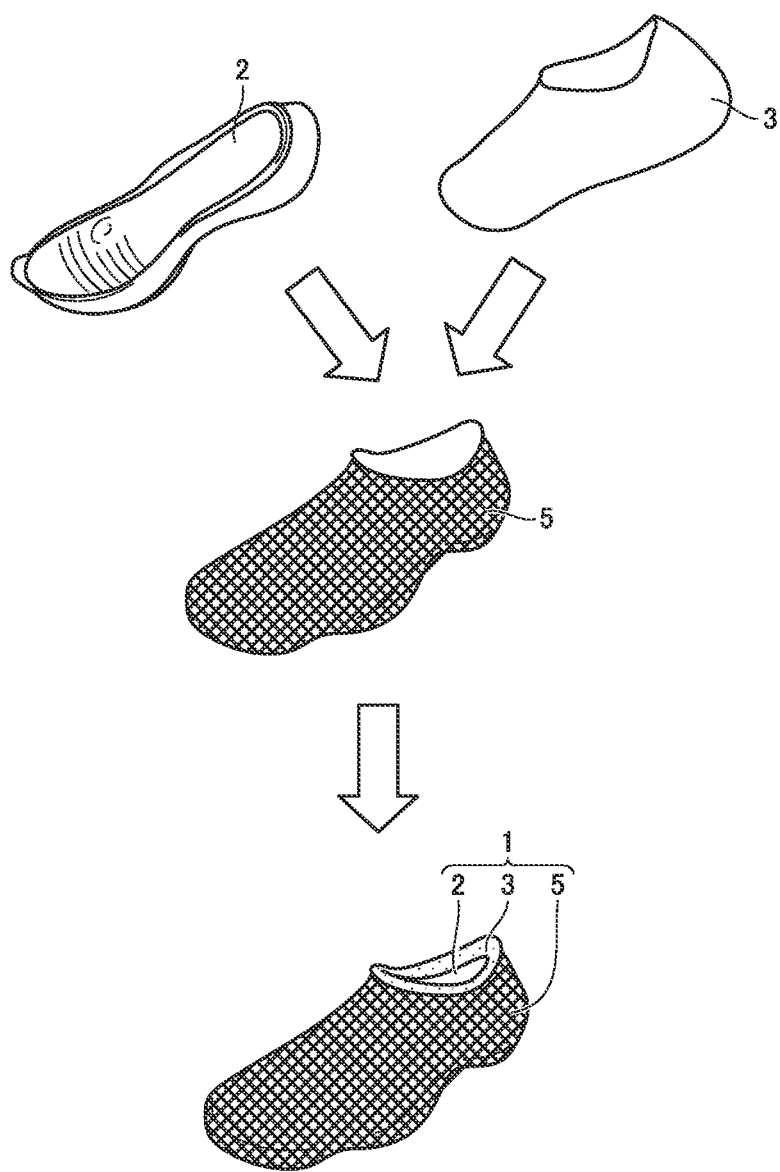
FIG. 12 is a schematic view showing an exemplary shoe including the upper according to the embodiment.

An exemplary shoe including the upper 3 produced by combining the main body portion 30 and the bottom surface portion 40 shown in FIG. 3A will now be described. FIG. 12 is a schematic view showing an exemplary shoe 1 including the upper 3 according to the embodiment. The shoe 1 shown in FIG. 12 is not produced simply by bonding a sole 2 and the upper 3 to each other but by combining the sole 2 and the upper 3 with each other and covering at least a part of them with a shell 5. The soles 2 are in stock in shops or manufacturers for each size of the shoe and the upper 3 is made with the production method described previously.

The shell 5 is a casing in which the sole 2 and the upper 3 are inserted. Though the shell 5 shown in FIG. 12 is such a model as entirely covering the sole 2 and the upper 3, the model of the shell 5 is not limited as such. The shell 5 is made of urethane, acrylic, or nylon. By way of example, the shell 5 is made by using a 3D printer. A plurality of types of shell models different in shape or the like may be prepared for the shell 5 based on various factors such as an extent of adjustment, design, and feeling of fit.

A method of producing the shoe 1 constituted of the upper 3, the sole 2, and the shell 5 is as below by way of example.

Initially, the sole 2 is placed in the shell 5 and the upper 3 is placed in the shell 5 where the sole 2 has been placed. Then, a part of the upper 3 is fixed to the shell 5 by sewing or the like. Finally, a shoe last is placed in the upper 3, and the shell 5 in which the sole 2 and the upper 3 have been inserted is heated in the heating apparatus (for example, a steam heater). After heating, the shoe last is removed from the upper 3 and thus the shoe 1 constituted of the upper 3, the sole 2, and the shell 5 is completed. Since the sole 2 inserted in the shell 5 is fixed by the upper 3 and the shell 5, the upper 3 and the sole 2 do not have to be bonded to each other with a glue. Therefore, burden imposed on a worker who produces shoes is lessened. Though processing for expanding and/or shrinking the main body portion 30 in conformity with the shape of the shoe last is performed in the heating apparatus 500 in producing the upper 3, the processing may be performed in heating processing after the sole 2 and the upper 3 are inserted in the shell 5.

The shoe 1 shown in FIG. 12 is by way of example and not limited to such a construction that the sole 2 and the upper 3 are inserted in the shell 5. The shoe 1 may be made by bonding the sole 2 and the upper 3 to each other or the outer periphery 30a of the main body portion 30 of the upper 3 may be connected to the sole 2 instead of the bottom surface portion 40. The shell 5 is not an essential feature.

A heat-shrinkable member is suitably employed for the sheet to be used as the upper 3, and in particular, a woven material, a knitted material, nonwoven fabric, or the like of heat-shrinkable synthetic fibers is employed. Examples of the heat-shrinkable synthetic fibers include those including polyester, polyurethane, or the like as a main component.

As set forth above, the upper 3 according to the embodiment is used for the shoe 1. The upper 3 includes the main body portion 30 located on the upper side of the shoe 1 and the bottom surface portion 40 connected to the main body portion 30 at at least a part of the outer periphery 30a of the main body portion 30. The main body portion 30 is seamless and is in a shape having the inner periphery 30b on the inner side of the outer periphery 30a.

Thus, the upper 3 according to the embodiment does not produce a local contact pressure in a foot portion, and heel portions in various shapes can be formed.

Preferably, the main body portion 30 and the bottom surface portion 40 are formed by cutting of sheets of an identical material. Since the main body portion 30 and the bottom surface portion 40 are thus obtained from sheets of a material identical in the direction of expansion and/or shrinkage and the ratio of expansion and/or shrinkage, production of the upper 3 in conformity with the shape of the shoe last 4 is facilitated.

Preferably, the main body portion 30 and the bottom surface portion 40 are formed as being integrated, by cutting of an identical sheet. The number of the cutting patterns can thus be reduced and works for combining the main body portion 30 and the bottom surface portion 40 that were cut out are facilitated.

Preferably, the bottom surface portion 40 is formed of a material different from a material for the main body portion 30. Thus, a material optimal for the bottom surface portion 40 and a material optimal for the main body portion 30 can be selected.

Preferably, the sheet is heat-shrinkable. The upper 3 in conformity with the shape of the shoe last 4 is thus more readily produced.

Preferably, the sheet has the first direction S1 in which the sheet has a first heat shrinkage and the second direction S2 in which the sheet has a second heat shrinkage higher than the first heat shrinkage. Preferably, the main body portion 30 is formed by cutting at a position where a longitudinal direction thereof is orthogonal to the second direction S2. Production of the upper 3 in conformity with the shape of the shoe last 4 is thus facilitated.

Preferably, the main body portion 30 has the outer periphery 30a connected to the sole 2 of the shoe 1 instead of the bottom surface portion 40. A construction of the shoe 1 including the upper 3 including only the main body portion 30 can thus be realized.

The shoe 1 according to the embodiment includes the upper 3 described previously and the sole 2 provided on the bottom surface portion 40 side of the upper 3. Thus, the shoe 1 according to the embodiment does not produce a local contact pressure in the foot portion and heel portions in various shapes can be formed.

The shoe 1 preferably includes the upper 3 and the sole 2 connected to the main body portion 30 at at least a part of the outer periphery of the main body portion 30. The construction of the shoe 1 including the upper 3 including only the main body portion 30 can thus be realized.

A production method of producing the upper 3 to be used for the shoe 1 according to the embodiment includes two-dimensionally developing three-dimensional shape data of the shoe last 4 and creating a cutting pattern of the main body portion 30 of the upper 3 which is seamless and is in a shape having the inner periphery 30b on the inner side of the outer periphery 30a, cutting a sheet into the main body portion 30 based on the cutting pattern, and covering the shoe last 4 with the cut-out main body portion 30 and expanding and/or shrinking the main body portion 30 in conformity with a shape of the shoe last 4. The creating a cutting pattern includes generating a two-dimensional pattern of the main body portion 30, the two-dimensional pattern being such a two-dimensional pattern that a portion corresponding to a topline of the shoe last 4 is set as the inner periphery 30b of the main body portion 30 and a portion corresponding to a surface of the shoe last 4 is virtually cut into a plurality of radially arranged strips 30c, adjusting a length of each gap 30d provided between adjacent strips 30c in the two-dimensional pattern such that an expanded and/or shrunk shape conforms to a shape of the shoe last 4, and setting the outer periphery of the two-dimensional pattern including each adjusted gap 30d as the outer periphery 30a of the cutting pattern.

The production method of producing the upper 3 according to the embodiment can thus produce the upper 3 that does not produce a local contact pressure in a foot portion and with which heel portions in various shapes can be formed.

Preferably, the adjusting a length of each gap 30d includes adjusting the length of the outer periphery of each gap 30d based on relation of the direction of expansion and/or shrinkage and the ratio of expansion and/or shrinkage of the main body portion 30 in conformity with the shape of the shoe last 4 with a tangential direction of the outer periphery of each gap 30d. Thus, when the main body portion 30 is combined with the bottom surface portion 40, consistency between the outer periphery 30a of the main body portion 30 and the outer periphery 40a of the bottom surface portion 40 is improved.

Preferably, the creating a cutting pattern further includes creating the cutting pattern of the bottom surface portion 40 of the upper 3 connected to the main body portion 30 at at least a part of the outer periphery 30a of the main body portion 30 and cutting out the bottom surface portion 40 from a material identical to a material for a sheet from which the main body portion 30 is cut out. Since the main body portion 30 and the bottom surface portion 40 are thus obtained from a sheet of a material identical in the direction of expansion and/or shrinkage and the ratio of expansion and/or shrinkage, production of the upper 3 in conformity with the shape of the shoe last 4 is facilitated.

Preferably, the creating a cutting pattern includes creating such a cutting pattern that the main body portion 30 and the bottom surface portion 40 of the upper 3 connected to the main body portion 30 at at least a part of the outer periphery 30a of the main body portion 30 are integrated. The number of cutting patterns can thus be reduced and works for combining the main body portion 30 and the bottom surface portion 40 that were cut out are facilitated.

Preferably, the sheet has the first direction S1 in which the sheet has the first heat shrinkage and the second direction S2 in which the sheet has the second heat shrinkage higher than the first heat shrinkage, and the adjusting a length of each gap 30d includes adjusting the gap 30d in a direction identical to the first direction S1 to be narrower than the gap 30d in a direction identical to the second direction S2. A cutting pattern of the seamless main body portion 30 of the upper 3 in the shape having the inner periphery 30b on the inner side of the outer periphery 30a can thus be created for the heat-shrinkable sheet.

Other Modifications

Figure 13A:
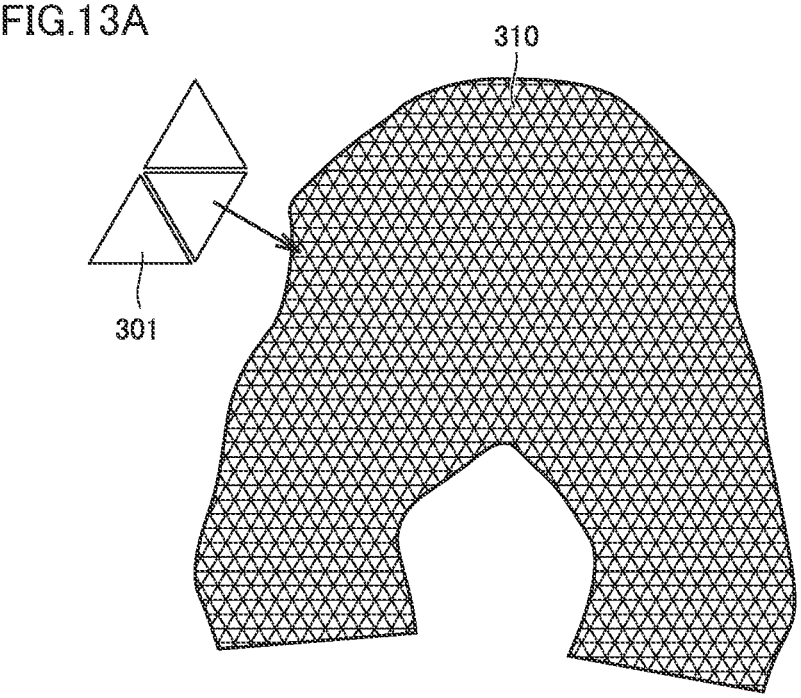
FIGS. 13A and 13B schematic views showing exemplary adjustment of a length of an outer periphery of the main body portion in consideration of a direction of expansion and/or shrinkage and a ratio of expansion and/or shrinkage of a sheet.
Figure 13B:
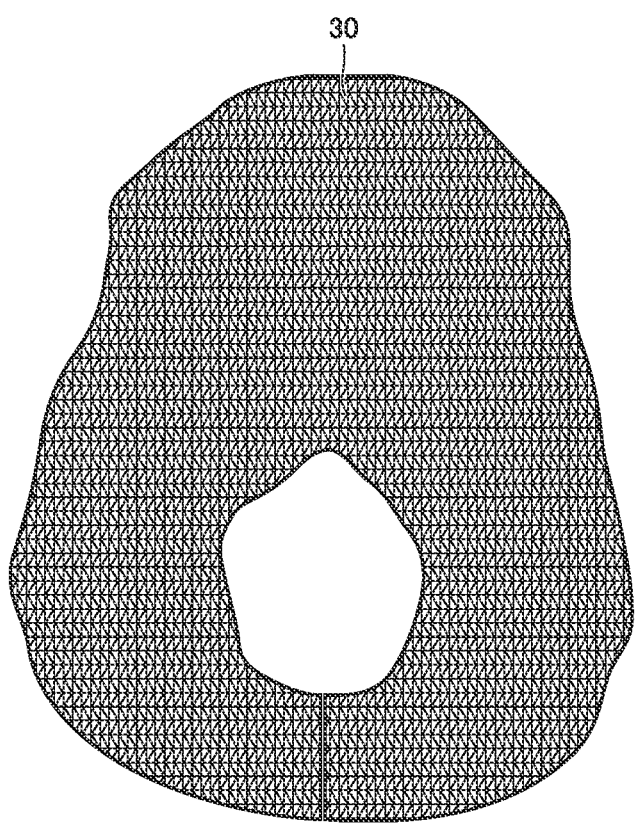

In the embodiment described previously, a method of adjusting the length of the outer periphery 30a of the main body portion 30a to be in conformity with the shape of the shoe last 4 by adjusting the length of each gap 30d in consideration of the direction of expansion and/or shrinkage and the ratio of expansion and/or shrinkage of the sheet with the simulation program 1108 is described. The method of adjusting the length of the outer periphery 30a of the main body portion 30, however, is not limited as such, and another method may be applicable. The main body portion 310 in the U shape may be deformed to the seamless annular and hollow main body portion 30 in consideration of the direction of expansion and/or shrinkage and the ratio of expansion and/or shrinkage of the sheet. FIGS. 13A and 13B are schematic views showing exemplary adjustment of the length of the outer periphery 30a of the main body portion 30 in consideration of the direction of expansion and/or shrinkage and the ratio of expansion and/or shrinkage of a sheet.

Initially, as shown in FIG. 13A, the design support apparatus 100 creates the main body portion 310 in the U shape. The simulation program 1108 divides the main body portion 310 into a plurality of triangular meshes 301 by using a finite element method, and deforms the main body portion 310 to the seamless annular and hollow main body portion 30 as shown in FIG. 13B, with a restriction condition such as the direction of expansion and/or shrinkage and the ratio of expansion and/or shrinkage of the sheet, the length of the outer periphery 40a of the bottom surface portion 40, and a heating temperature being applied to each element. The design support apparatus 100 adopts the shape of the main body portion 30 shown in FIG. 13B as the cutting pattern of the main body portion 30.

In the embodiment described previously, the upper 3 is described as being produced from a heat-shrinkable material. Without being limited to the heat-shrinkable material, any expandable and/or shrinkable material may be applicable. For example, a fiber sheet in a two-layered structure in which a first layer composed of fabric including shape-memory threads is combined with a second layer composed of nonwoven fabric or in a three-layered structure in which a first layer composed of fabric is sandwiched between a second layer and a third layer each composed of nonwoven fabric may be applicable as the material to be used for the upper 3. The shoe last 4 is covered with this fiber sheet, and the fiber sheet is heated in the heating apparatus 500 to expand and/or shrink in conformity with the shape of the shoe last 4 and to maintain the expanded and/or shrunk shape. A method of maintaining the shape of the fiber sheet expanded and/or shrunk with the shoe last 4 being covered with the fiber sheet is not limited to the method of heating in the heating apparatus 500, and a method of setting a surface with a resin or a method of bonding a reinforcing member to the fiber sheet may be applicable.

In the embodiment described previously, the main body portion 30 and the bottom surface portion 40 are combined by sewing or with an adhesive to produce the upper 3 in the three-dimensional shape. Without being limited as such, the upper in the three-dimensional shape may be composed only of the main body portion 30 or the main body portion 30 may be connected to the sole of the shoe at the outer periphery 30a instead of the bottom surface portion 40.

In the embodiment described previously, the main body portion 30 is described as being formed by cutting a sheet. The main body portion 30 in the shape having the inner periphery 30b on the inner side of the outer periphery 30a, however, may be formed by seamless knitting.

The upper producing system 10 at one store including the design support apparatus 100, the measuring apparatus 200, the cutting apparatus 400, and the heating apparatus 500 has been described with reference to FIG. 1. The upper producing system 10, however, may include a store where the measuring apparatus 200 is not provided and the mobile terminal 300 such as a smartphone is used to measure a foot shape. The upper producing system 10 may also include a store where the cutting apparatus 400 is not provided and the cutting apparatus 400 placed at another store is used to cut a sheet and produce an upper. Shoe last producing systems at various stores may be connected to a data center where design support of the cutting pattern of the sheet may be performed. The upper producing system 10 described previously in the embodiment may naturally be adopted as a part of a manufacturing system that manufactures a shoe, without being limited to production of the upper 3.

Though an embodiment of the present invention has been described, it should be understood that the embodiment disclosed herein is illustrative and non-restrictive in every respect. The scope of the present invention is defined by the terms of the claims and is intended to include any modifications within the scope and meaning equivalent to the terms of the claims.

What is claimed is:

1. A production method of producing an upper to be used for a shoe, the production method comprising:
   two-dimensionally developing three-dimensional shape data of a shoe last and creating a cutting pattern of a main body portion of the upper which is seamless and is in a shape having an inner periphery on an inner side of an outer periphery;
   cutting a sheet into the main body portion based on the cutting pattern; and covering the shoe last with the cut-out main body portion and at least one of expanding or shrinking the main body portion in conformity with a shape of the shoe last, wherein the creating a cutting pattern includes
- generating a two-dimensional pattern of the main body portion, such that a portion corresponding to a topline of the shoe last is set as an inner periphery of the main body portion and a portion corresponding to a surface of the shoe last is virtually cut into a plurality of radially arranged strips,
- adjusting a length of each gap provided between adjacent strips in the two-dimensional pattern such that at least one of an expanded or shrunk shape conforms to the shape of the shoe last, and
- setting the outer periphery of the two-dimensional pattern including each adjusted gap as the outer periphery of the cutting pattern.

2. The production method according to claim 1, wherein the adjusting a length of each gap includes adjusting the length of each gap based on relation of a direction of at least one of expansion or shrinkage and a ratio of at least one of expansion or shrinkage of the main body portion in conformity with the shape of the shoe last with a tangential direction of the outer periphery of each gap.

3. The production method according to claim 2, wherein the creating a cutting pattern further includes
- creating the cutting pattern of a bottom surface portion of the upper connected to the main body portion at at least a part of the outer periphery of the main body portion, and
- cutting out the bottom surface portion from a material identical to a material for a sheet from which the main body portion is cut out.

4. The production method according to claim 3, wherein the creating a cutting pattern includes creating such a cutting pattern that the main body portion and the bottom surface portion of the upper connected to the main body portion at at least a part of the outer periphery of the main body portion are integrated.

5. The production method according to claim 1, wherein the creating a cutting pattern further includes
- creating the cutting pattern of a bottom surface portion of the upper connected to the main body portion at at least a part of the outer periphery of the main body portion, and
- cutting out the bottom surface portion from a material identical to a material for a sheet from which the main body portion is cut out.

6. The production method according to claim 5, wherein the creating a cutting pattern includes creating such a cutting pattern that the main body portion and the bottom surface portion of the upper connected to the main body portion at at least a part of the outer periphery of the main body portion are integrated.

7. The production method according to claim 1, wherein the sheet is heat-shrinkable.

8. The production method according to claim 7, wherein
- the sheet has a first direction in which the sheet has a first heat shrinkage and a second direction in which the sheet has a second heat shrinkage higher than the first heat shrinkage, and
- the adjusting a length of each gap includes adjusting the length of the gap in a direction identical to the first direction to be shorter than the length of the gap in a direction identical to the second direction.

* * * * *